United States Patent [19]

Boggs et al.

[11] 3,976,431

[45] Aug. 24, 1976

[54] WIPED-WALL REACTOR

[75] Inventors: Beryl Aaron Boggs; Laszlo Joseph Balint; Patrick William Ager; Edward Jerome Buyalos, all of Chester, Va.

[73] Assignee: Allied Chemical Corporation, New York, N.Y.

[22] Filed: May 6, 1975

[21] Appl. No.: 575,000

[52] U.S. Cl. .............................. 23/285; 159/6 WH; 159/25 R; 259/9
[51] Int. Cl.² ..................... B01J 1/00; B01D 1/22
[58] Field of Search .......... 23/285; 159/6 W, 6 WH, 159/25 A, 25 R; 259/9, 10, 25, 26, 109, 110; 118/19, 417

[56] References Cited
UNITED STATES PATENTS

| | | | |
|---|---|---|---|
| 1,308,819 | 7/1919 | Taylor | 159/6 WH |
| 2,510,057 | 6/1950 | Baker et al. | 259/109 X |
| 2,974,725 | 3/1961 | Samesreuther et al. | 159/6 W |
| 3,216,042 | 11/1965 | Strittmatter | 159/6 W X |
| 3,323,843 | 6/1967 | Strittmatter | 159/6 W X |
| 3,348,600 | 10/1967 | Monty | 159/6 WH |
| 3,410,533 | 11/1968 | Penney | 259/9 |
| 3,591,344 | 7/1971 | Schnock et al. | 23/285 |
| 3,617,225 | 11/1971 | Kuehne et al. | 23/285 |
| 3,635,901 | 1/1972 | Urgesi et al. | 260/78 R X |
| 3,728,083 | 4/1973 | Greeburg et al. | 23/285 |

*Primary Examiner*—Morris O. Wolk
*Assistant Examiner*—Arnold Turk
*Attorney, Agent, or Firm*—Richard A. Anderson

[57] ABSTRACT

In an essentially horizontal totally enclosed cylindrical wiped-wall polymer reactor having an essentially horizontal polymer flow, a pool of polymer in its lower portion, and driven wheels to create high surface area in the polymer to facilitate evaporation of volatiles from the polymer, the improvement comprising a free-wheeling drag wheel driven by the driven wheels, with a wiping means mounted on the driven wheels and actuated by the drag wheel to wipe the entire internal circumference of the cylindrical reactor. The drag wheel generates a force to urge the wiping means outward against the internal circumference of the reactor. The force is generated by the drag of the pool of polymer on the drag wheel. This keeps the wall of the reactor wiped with a fresh film of polymer. The process and apparatus is particularly adaptable to driven wheels and drag wheels eccentrically mounted in the reactor.

12 Claims, 4 Drawing Figures

WIPED-WALL REACTOR

BACKGROUND OF THE INVENTION

This invention relates to an improved wiped-wall reactor, more particularly to a free-wheeling drag wheel driven by driven wheels in the reactor with a wiping means mounted on the driven wheels and actuated by the drag wheel so as to wipe the entire internal circumference of the cylindrical reactor, where the drag wheel generates a force to urge the wiping means against the internal circumference of the reactor, with the force generated by the drag of the pool of polymer on the drag wheel.

This invention is particularly adapted for use in a wiped-wall reactor wherein the driven wheels and drag wheel are mounted on a shaft eccentric with respect to the reactor horizontal axis. Such a configuration is shown and described in U.S. Pat. No. 3,617,225; see particularly FIGS. 9 and 10. Also see U.S. Pat. Nos. 3,469,948 and 3,476,522 for other types of wiped-wall reactors. U.S. Pat. No. 3,635,901 to Urgesi et al. uses centrifugal force and a fly weight to urge a wiping by distributor vane as shown in FIG. 5 of that patent. However, none of the prior art apparatus or processes were adequate.

The prior art discloses that a continuous wiping or wetting of fresh polymer helps to overcome formation of gel-like material due to formation of vinyl and polyvinyl compounds from polymer scission due to thermal degradation. Previously, these gels required periodic shutdown and flushing before the polymer being formed could pick-up gel-like deposits which would accumulate in said spaces in the reactor and fall into the pool of polymer.

SUMMARY OF THE INVENTION

The prior art apparatus is an essentially horizontal totally enclosed cylindrical wiped-wall polymer reactor having essentially horizontal polymer flow. This prior reactor has a pool of the polymer in its lower portion and has driven wheels to create high polymer surface area to facilitate evaporation of volatiles from the polymer. The improvement of this invention comprises a free-wheeling drag wheel driven by the driven wheels, and a wiping means mounted on the driven wheels and actuated by the drag wheel so as to wipe the entire internal circumference of the cylindrical reactor. The drag wheel generates a force to urge the wiping means against the internal circumference of the reactor. The force is generated by the drag of the pool of polymer on the drag wheel. By "wheel" is meant not only a conventional wheel with a hub, spokes and rim, but also the concept of omitting the outer rim and using a series of spokes radiating from a hub.

The apparatus of this invention is particularly suited for driven wheels and the drag wheel being mounted eccentrically with respect to the reactor horizontal axis. Preferably, the driven wheels and the drag wheel are mounted on the same shaft. For all but high viscosity polymer, it is preferable to have a drag means mounted on the drag wheel. Various drag means can be used to create different drag friction in the polymer pool. For example, for medium viscosity polymer, flat projection extending generally traverse to the radius of the drag wheel can be used, and for lower viscosity a cup-like device projecting outwardly from the drag wheel essentially transversely could be used.

In the preferred embodiment, the driven wheel has a turbine-like projection to provide pumping of the polymer through the reactor.

Also in a preferred embodiment, the driven wheels adjacent the end of the reactor have mounted thereon means for wiping the end walls of the reactor.

The apparatus of this invention uses a drag wheel which transmits the force generated by the drag wheel dragging through the pool of polymer in the reactor. This force is transmitted to the wiping means by means of a sliding contact of a restraining means, fixably mounted on the drag wheel, with an arm of the wiping means. The arm of the wiping means pivots from a point stationary on the driven wheel to urge the wiping means outward. Preferably, this stationary point on the driven wheel is the connecting means to drive the drag wheel. The restraining means can be a pair of pins mounted on the drag wheel or any other means to create a slot which the arm of the wiping means can slide through.

The process of this invention takes place is an essentially horizontal totally enclosed cylindrical wipe-wall polymer reactor having essentially horizontal polymer flow. The reactor has a pool of polymer in its lower portion. The prior art process is removing volatiles from the polymer by evaporation by creating high polymer surface area with driven wheels in the reactor. The improvement of this invention comprises keeping the wall of the reactor wetted with a fresh film of polymer and driving a free-wheeling drag wheel with the driving wheels, the driven wheels having wiping means mounted thereon. The wiping means is actuated by the drag wheel. The drag wheel is moved through a pool of the polymer to impede rotation of the drag wheel and generate a force to urge the wiping means against the entire internal circumference of the reactor. The drag wheel also creates higher surface area of the polymer.

Advantages

The following advantages can be obtained by using this invention.

1. This invention can be used mounted eccentrically or mounted concentrically in a cylindrical reactor even when the internal circumference of the reactor is not machined because the wiper follows all internal reactor wall contours.

2. The invention reduces gel formation and thereby creates more reliable polymer with less gels which can cause breaks in yarn or flaws in other fabricated polymer products. Periodic flushing is less frequently required or eliminated.

3. The invention automatically compensates for viscosity changes by automatically increasing or decreasing the force transmitted to the wiper as the drag to the wheel increases or decreases with viscosity.

4. The drag means can be varied along the circumference of the drag wheel to provide a varying force on the wiper when the amount of polymer on the wiper varies. For example, when there is much polymer on the wiper as it just leaves the pool of polymer, a greater force can be applied by having more drag elements on the wheel that is in the pool at that time. Conversely, when there is little polymer on the wiper, as when it is nearly empty in coming down toward the pool, the portion of the wheel that is dragging in the pool can have fewer drag elements and thereby transmits less force.

5. The design of this invention is mechanically reliable with no springs or such which could break and jam or destroy the reactor internal apparatus.

6. There is no adjustment necessary to properly align the shaft mounting the driven and drag wheels.

7. The same design is effective in a wide range of viscosities.

8. This invention can be used at low rotational speeds.

9. The wiper of this invention increases the surface area of the polymer by wiping film on the wall and by creating a falling film from the wiper means. This reduces reactor size requirements.

10. The drag wheel creates more surface area in the polymer by creating falling film, especially when drag elements, such as cups, are used. This also reduces reactor size requirements.

DESCRIPTION OF THE PREFERRED EMBODIMENTS

Figure 1:
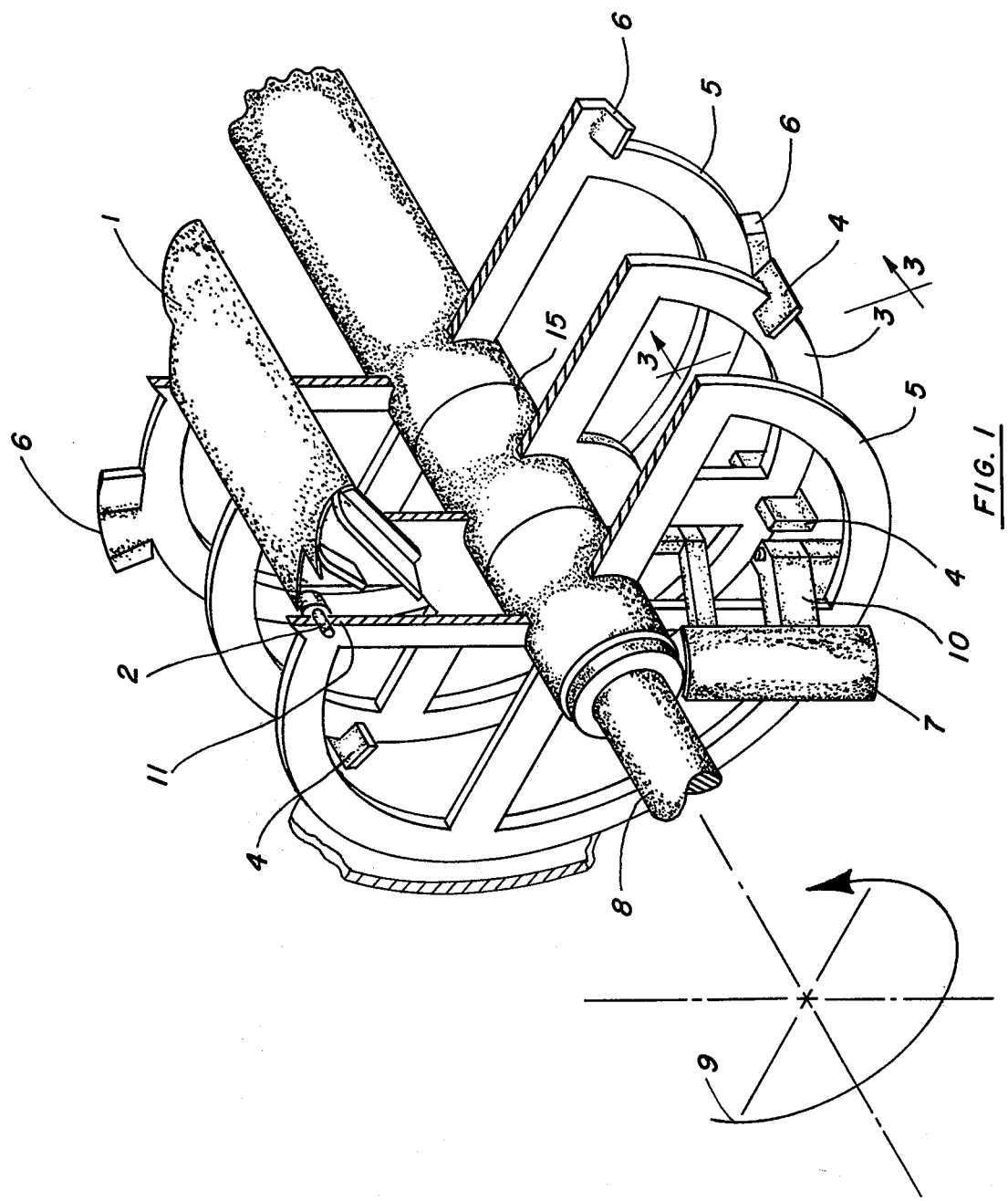
FIG. 1 is an isometric partially cut away view of the end drag wheel and the two end driven wheels driving it.

FIG. 1 shows the end wheels of this invention as it would be mounted at the end of a reactor. It would be mounted as shown in U.S. Pat. No. 3,617,225, hereby incorporated by reference, as shown in FIGS. 9 and 10, but without the baffles labeled 4b. In FIG. 1, wiper plate 1 is driven by driven wheels 5 contacting pin 2 in plate 1 at 11. Thus, free-wheeling drag wheel 3 is free to rotate on hub 15 mounted on shaft 8 between driven wheels 5 which are fixed to rotating shaft 8. Shaft 8 rotates in the direction shown by arrow 9. Drag wheel 3 has flat projecting drag means 4 at various locations along the circumference as shown. Driven wheel 5 has turbine-like projections 6 to provide pumping of the polymer through the reactor. Driven wheel 5 also has mounted thereon, by arm 10, an end wall wiping blade 7.

Figure 2:
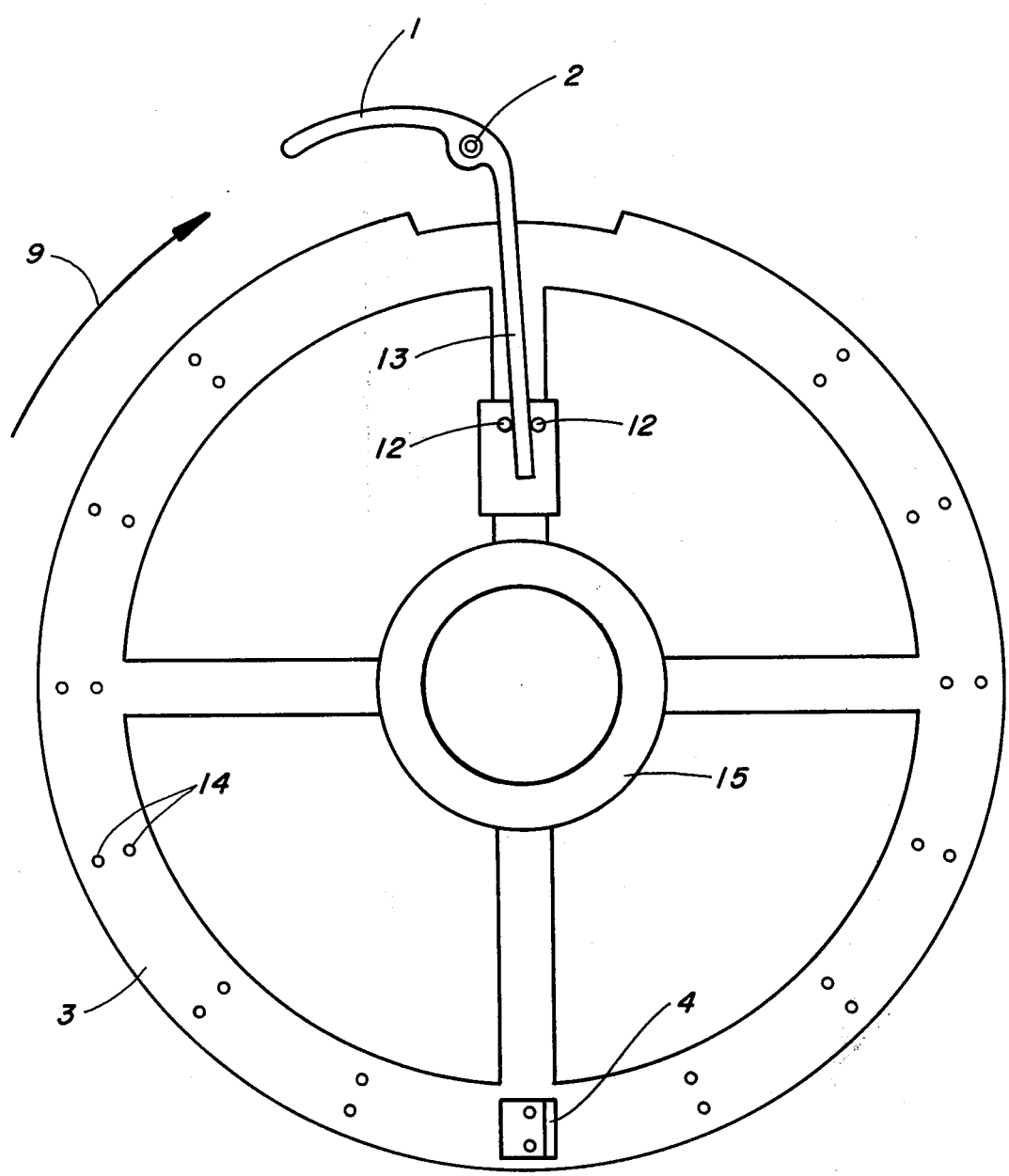
FIG. 2 is a side-view of a typical free-wheeling drag wheel such as that shown in FIG. 1.

FIG. 2 shows an end view of free-wheeling drag wheel 3 with another type of flat projecting drag means 4. Various holes, such as 14, along the circumference of drag wheel 3 can be used to mount various drag means, such as 4, along its circumference. Drag wheel 3 rotates in the direction shown by arrow 9. Drag wheel 3 rotates free-wheeling on hub 15 which is mounted on shaft 8 shown in FIG. 1. The drag of the polymer in the lower half of the reactor on drag wheel 3 creates a force transmitted through the spokes of drag wheel 3 to the pins 12 which are fixably mounted on the spokes of drag wheel 3. Arm 13 then slides through pins 12. Pins 12 transmit the force of the drag on drag wheel 3 to arm 13 of wiper plate 1 causing it to pivot outwardly about pin 2. Thus, the drag wheel 3 transmits the force generated by the drag wheel 3 dragging through the pool of polymer to the wiping means by means of sliding contact through the restraining means 12 to arm 13 causing the wiper plate 1 to pivot about the stationary point at pin 2, and urges the wiper plate 1 outwardly to wipe the internal shell of the reactor. Pins 2 are mounted in wheel 5.

Figure 3:
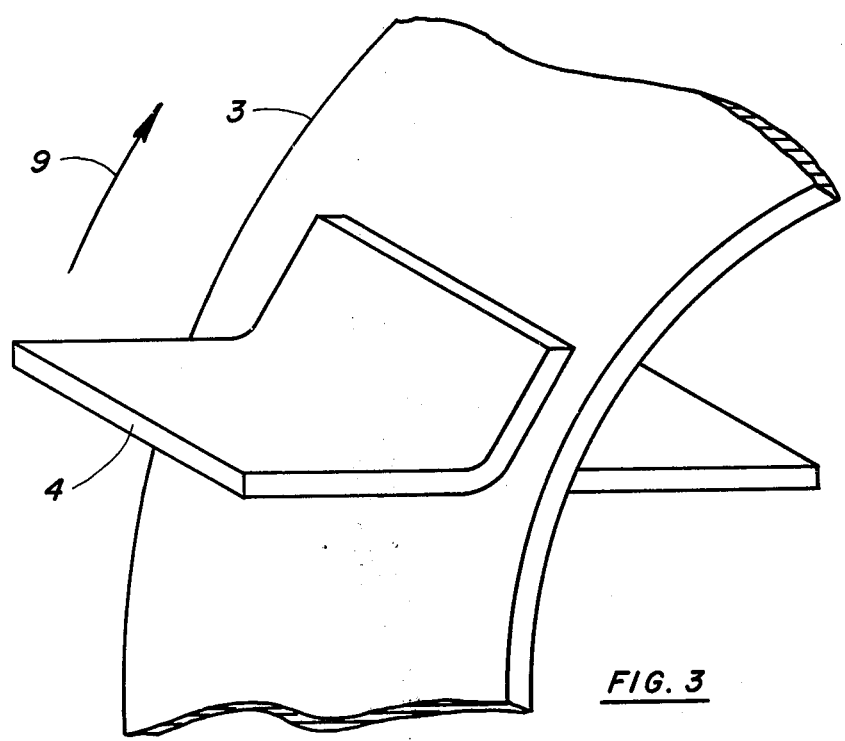
FIG. 3 shows a typical flat drag means projecting from a portion of the drag means.

FIG. 3 shows another embodiment of flat projecting drag means 4 on drag wheel 3 rotating in the direction shown by arrow 9.

Figure 4:
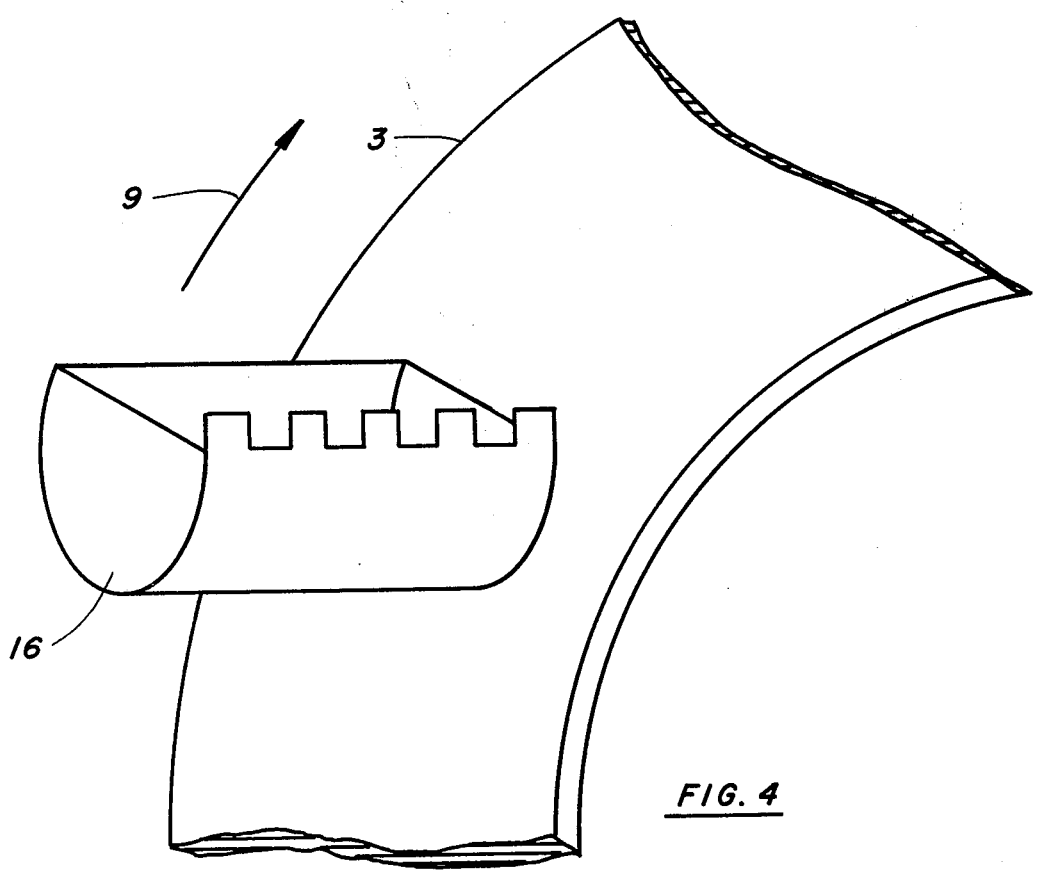
FIG. 4 shows a typical drag means cup projecting from a portion of the drag means.

FIG. 4 shows drag means cup 16 projecting outwardly from drag wheel 3 which rotates in direction shown by arrow 9.

We claim:

1. In an essentially horizontal totally enclosed cylindrical wiped-wall polymer reactor having essentially horizontal polymer flow, said reactor having a pool of said polymer in its lower portion and having driven wheels to create high polymer surface area said high surface area to facilitate evaporation of volatiles from said polymer, the improvement comprising a free-wheeling drag wheel driven by said driven wheels, a wiping means mounted on said driven wheels and actuated by said drag wheel so as to wipe the entire internal circumference of said cylindrical reactor, whereby said drag wheel generates a force to urge said wiping means against said internal circumference of said reactor, said force generated by the drag of said pool of said polymer on said drag wheel.

2. The apparatus of claim 1 wherein said driven wheels and said drag wheel are mounted on the same shaft.

3. The apparatus of claim 2 wherein said driven wheels and said drag wheel are mounted eccentrically with respect to said reactor horizontal axis.

4. The apparatus of claim 1 wherein said drag wheel has a drag improving means mounted thereon.

5. The apparatus of claim 4 wherein said drag means is a flat projection extending generally transverse to the radius of said drag wheel.

6. The apparatus of claim 4 wherein said drag means is a cup-like device projecting outwardly from said drag wheel essentially transversely to the radius of said drag wheel.

7. The apparatus of claim 1 wherein each of said driven wheels has turbine-like projections to provide pumping of said polymer through said reactor.

8. Apparatus of claim 1 wherein said driven wheels adjacent the ends of said reactor have mounted thereon means for wiping the end walls of said reactor.

9. Apparatus of claim 1 wherein said drag wheel transmits said force generated by said drag wheel to said wiping means by means of sliding contact of restraining means fixably mounted on said drag wheel with an arm of said wiping means, said arm pivoting from a point stationary on said driven wheel to urge said wiping means outward.

10. Apparatus of claim 9 wherein said arm pivots about the connecting means to drive said drag wheel.

11. Apparatus of claim 9 wherein said restraining means is a pair of pins mounted on said drag wheel.

12. In the process of removing volatiles from a polymer by evaporation by creating high polymer surface area with driven wheels in an essentially horizontal totally enclosed cylindrical wiped-wall polymer reactor having essentially horizontal polymer flow, said reactor having a pool of said polymer in its lower portion, the improvement comprising a. keeping the wall of said reactor wetted with a fresh film of polymer by driving a free-wheeling drag wheel by means of said driven wheels, said driven wheel having wiping means mounted thereon, said wiping means being actuated outward radially said drag wheel, concurrently b. moving said drag wheel through said pool of said polymer to viscously impede rotation of said drag wheel and generate a force to urge said wiping means against the entire internal circumference of said reactor, with each revolution of said wiping means.

* * * * *

UNITED STATES PATENT OFFICE
CERTIFICATE OF CORRECTION

PATENT NO. : 3,976,431
DATED : August 24, 1976
INVENTOR(S) : Beryl Aaron Boggs et al.

It is certified that error appears in the above–identified patent and that said Letters Patent are hereby corrected as shown below:

Column 2, line 22, "is" should read --in--.

Column 4, line 61, insert --by-- after "radially".

Signed and Sealed this

Twenty-third Day of November 1976

[SEAL]

Attest:

RUTH C. MASON
Attesting Officer

C. MARSHALL DANN
Commissioner of Patents and Trademarks